United States Patent Office 3,763,147
Patented Oct. 2, 1973

3,763,147
3-OXYGENATED-6,7-METHYLENE-
20-SPIROXANES
Glen E. Arth, Cranford, N.J., assignor to
Merck & Co., Inc., Rahway, N.J.
No Drawing. Continuation-in-part of applications Ser. No. 87,576, Nov. 6, 1970, and Ser. No. 164,931, July 21, 1971. This application May 22, 1972, Ser. No. 255,855
Int. Cl. C07c 173/00
U.S. Cl. 260—239.55 R
16 Claims

ABSTRACT OF THE DISCLOSURE

The invention disclosed herein relates to 3-oxygenated-6,7-methylene-20-spiroxanes and their 19-nor derivatives which have $\Delta^4$-unsaturation (including $\Delta^{1,4}$) in ring A; hydrogen, keto or $\beta$-hydroxy at the 11-position; hydrogen or fluoro at the 9$\alpha$-position; and hydrogen or keto at the 21-position; and, where the C-21 substituent in keto, the hydrolyzed lactone and pharmacologically acceptable salts thereof. These novels $\Delta^4$-unsaturated-3-oxygenated-6,7-methylene-20-spiroxane compounds are prepared by reacting the corresponding 3-oxygenated-20-spiroxa-4,6-diene with dimethyl-oxo-sulfonium methylide, followed, where $\Delta^{1,4}$-unsaturation is desired, by reaction of the resulting 3-oxygenated-6,7-methylene-20-spirox - 4 - ene- with dichlorodicyanobenzoquinone. The new 3-oxygenated-6,7-methylene-20-spirox-4-enes and 3 - oxygenated-6,7-methylene-20-spiroxa-1,4-dienes are potent aldosterone inhibitors. They block the salt-retaining effects of aldosterone and other salt-retaining steroids and are therefore useful in the alleviation of diseases such as congestive heart failure, nephrosis and cirrhosis of the kidney in which aldosterone secretion is increased.

This is a continuation-in-part of applications Ser. No. 87,576, filed Nov. 6, 1970, now abandoned, and Ser. No. 164,931, filed July 21, 1971, now abandoned, and said application Ser. No. 87,576 is, in turn, a continuation of application Ser. No. 715,160, filed Mar. 2, 1968, now abandoned.

The compounds of the present invention are conveniently prepared by reacting dimethyl-oxo-sulfonium methylide with a 3-oxygenated-20-spiroxa-4,6-diene, as for example 20-spiroxa-4,6-diene-3-one;
19-nor-20-spiroxa-4,6-diene-3-one;
20-spiroxa-4,6-diene-3,21-dione; and
19-nor-20-spiroxa-4,6-diene-3,21-dione;
20-spiroxa-4,6-diene-11$\beta$-ol-3-one;
9$\alpha$-fluoro-20-spiroxa-4,6-diene-11$\beta$-ol-3-one;
20-spiroxa-4,6-diene-11$\beta$-ol-3,21-dione; and
9$\alpha$-fluoro-20-spiroxa-4,6-diene-11$\beta$-ol-3,21-dione, thereby forming the corresponding 6,7-methylene derivative. The reaction is conveniently conducting by bringing together, under nitrogen, a mineral oil dispersion of sodium hydride and trimethyl sulfoxonium iodide and slowly adding thereto dry dimethyl sulfoxide whereupon reaction occurs with the formation of dimethyl-oxo-sulfonium methylide. To the resulting mixture is then added an amount of the 3-oxygenated-20-spiroxa-4,6-diene such that the molar ratio of dimethyl-oxo-sulfonium methylide to steroid is within the range of approximately 1:1 to 5:1; it is ordinarily preferred to use a molar ratio of about 1:1 where the 3-oxygenated -20-spiroxa-4,6-diene starting steroid is a 19-nor-20-spiroxa-4,6-diene-3-one (or 3,21-dione) or 20-spiroxa-4,6-diene-3,21-dione. The reaction is allowed to proceed for approximately 15 hours at about room temperature, and the steroid product is conveniently recovered from the reaction mixture by adding the reaction mixture to ice-water, extracting the steroid product with a water-immiscible organic solvent such as ether, evaporating the organic solvent, and purifying the residual material by chromatography over alumina. There is thus obtained the corresponding 3-oxygenated-6,7-methylene-20-spirox-4-ene product such as 6,7-methylene-20-spirox-4-ene-3-one;
6,7-methylene-19-nor-20-spirox-4-ene-3-one;
6,7-methylene-20-spirox-4-ene-3,21-dione;
6,7-methylene-19-nor-20-spirox-4-ene-3,21-dione;
6,7-methylene-20-spirox-4-ene-11$\beta$-ol-3-one;
6,7-methylene-9$\alpha$-fluoro-20-spirox-4-ene-11$\beta$-ol-3-one;
6,7-methylene-20-spirox-4-ene-11$\beta$-ol-3,21-dione;
6,7-methylene-9$\alpha$-fluoro-20-spirox-4-ene-11$\beta$-ol-3,21-dione, and the like.

The reaction of said 3-oxygenated-6,7-methylene-20-spirox-4-ene-compound with 2,3-dichloro - 5,6 - dicyanobenzoquinone may be conducted by heating the reactants together in an organic solvent such as dioxane, preferably under substantially anhydrous conditions and under a nitrogen atmosphere. When dioxane is used as the reaction solvent, the reaction is ordinarily carried out by heating the reaction mixture at a reflux temperature for a period of about 3 hours. The resulting mixture is then diluted with a water-immiscible organic solvent such as ethyl acetate; the organic solution is washed with a dilute aqueous alkaline solution, then with water, dried and evaporated to dryness; the residual material is conveniently purified by chromatography using a silica gel column to produce the corresponding 3-oxygenated-6,7-methylene-20-spiroxa-1,4-diene product such as 6,7-methylene-20-spiroxa-1,4-diene-3-one;
6,7-methylene-19-nor-20-spiroxa-1,4-diene-3-one;
6,7-methylene-20-spiroxa-1,4-diene-3,21-dione;
6,7-methylene-19-nor-20-spiroxa-1,4-diene-3,21-dione;
6,7-methylene-20-spiroxa-1,4-diene-11$\beta$-ol-3-one;
6,7-methylene-9$\alpha$-fluoro-20-spiroxa-1,4-diene-11$\beta$-ol-3-one;
6,7-methylene-20-spiroxa-1,4-diene-11$\beta$-ol-3,21-diene;
6,7-methylene-9$\alpha$-fluoro-20-spiroxa-1,4-diene-11$\beta$-ol-3,21-diene, and the like.

When there is obtained, in accordance with the procedures hereinabove described, 6,7-methylene-20-spirox-4-ene (or 1,4-diene)-3-one steroid containing 11$\beta$-hydroxy substituent, this compound may be converted to the corresponding 11-ketone by reaction with an oxidizing agent such as chromium trioxide-pyridine complex; the reaction is ordinarily conducted by adding a pyridine solution of the 11$\beta$-hydroxy steriod compound to the complex formed by adding chromium trioxide to excess pyridine, and allowing the oxidation reaction to proceed at approximately room temperature for a period of about 15 hours. The 11-keto steroid product is conveniently recovered from the reaction mixture by pouring the latter into water, extracting the aqueous mixture with a water-immiscible organic solvent such as ether, ethyl acetate, and the like; the organic solvent layer is then washed with dilute aqueous acid, then with water, dried and evaporated to dryness; the residual material is purified by crystallization from an organic solvent such as petroleum ether to give the corresponding 6,7-methylene-20-spirox-4-ene (or 1,4-diene)-3,11-dione steroid such as 6,7-methylene-20-spirox-4-ene-3,11-dione;
6,7-methylene-20-spirox-4-ene-3,11,21-trione;
6,7-methylene-9α-fluoro-20-spirox-4-ene-3,11-dione;
6,7-methylene-9α-fluoro-20-spirox-4-ene-3,11,21-trione;
6,7-methylene-20-spiroxa-1,4-diene-3,11-dione;
6,7-methylene-20-spiroxa-1,4-diene-3,11,21-trione;
6,7-methylene-9α-fluoro-20-spiroxa-1,4-diene-3,11-dione;
6,7-methylene-9α-fluoro-20-spiroxa-1,4-diene-3,11,21-trione, and the like.

When there is obtained, in accordance with the procedures hereinabove described, a 6,7-methylene-20-spirox-4-ene (or 1,4-diene)-3-one steroid which contains only hydrogen at C–21, such as 6,7-methylene-20-spirox-4-ene-3-one, 6,7-methylene-20-spirox-4-ene-3,11-dione, and the like, this may be converted to the corresponding 21-ketone by reaction with an oxidizing agent such as t-butyl chromate; the t-butyl chromate is conveniently prepared by reacting chromium trioxide with butanol at about room temperature; the oxidation reaction is ordinarily conducted by adding an anhydrous carbon tetrachloride solution of t-butyl chromate, containing acetic anhydride and acetic acid, to a chloroform solution of the 6,7-methylene-20-spirox-4-ene (or 1,4-diene)-3-one, and heating the resulting mixture, preferably under reflux, under which conditions the oxidation reaction to form the C–21 ketone is substantially complete in about five hours. The 21-ketosteroid product is conveniently recovered from the reaction mixture by adding a reducing agent such an aqueous oxalic acid to reduce excess t-butyl chromate, then extracting with carbon tetrachloride; the organic layer is then washed, dried and evaporated, and the residual material is conveniently purified by chromatography to give the corresponding 6,7-methylene-20-spirox - 4 - ene-(or 1,4-diene)-3,21-dione steroid such as 6,7-methylene-20-spirox-4-ene-3,21-dione;
6,7-methylene-20-spirox-4-ene-3,11,21-trione;
6,7-methylene-9α-fluoro-20-spirox-4-ene-3,21-dione;
6,7-methylene-9α-fluoro-20-spirox-4-ene-3,11,21-trione;
6,7-methylene-20-spiroxa-1,4-diene-3,21-dione;
6,7-methylene-20-spiroxa-1,4-diene-3,11,21-trione;
6,7-methylene-9α-fluoro-20-spiroxa-1,4-diene-3,21-dione;
6,7-methylene-9α-fluoro-20-spiroxa-1,4-diene-3,11,21-trione, and the like.

The hydrolysis of the 6,7-methylene-20-spirox-4-ene-(or 1,4-diene)-3,21-dione steroid lactone is conveniently conducted by dissolving the steroid in an alcohol such as ethanol, methanol, and the like, and heating the solution with aqueous alkaline solution, as for example an aqueous alkali metal hydroxide such as aqueous sodium hydroxide, aqueous potassium hydroxide, and the like. The alcohol is then evaporated from the hydrolysis mixture, the residual aqueous solution is extracted with a water-immiscible organic solvent such as chloroform, and the aqueous solution is freeze-dried to give the hydrolyzed lactone, that is the salt of the corresponding 3'-[3-oxo-17β-hydroxy-6,7-methylene-androst-4-ene-(or androsta-1,4-diene)-17α - yl] propionic acid in substantially quantitative yield.

The following examples illustrate methods of carrying out the present invention, but it is to be understood that these examples are given for purposes of illustration and not of limitation.

EXAMPLE 1

To a thoroughly dry mixture of 1.8 g. of a 56.37% dispersion of sodium hydride in mineral oil (0.04246 moles) and 9.81 g. (0.04246 moles+5% excess) of trimethyl sulfoxonium iodide, maintained under a nitrogen atmosphere and cooled to a temperature of about 10° C., is slowly added 50 ml. of dry dimethyl sulfoxide at such a rate that foaming is not excessive. The resulting mixture is stirred at a temperature of about 20° C. for a period of about 2.5 hrs., or until all sodium hydride has reacted. To the thus formed dimethyl-oxo-sulfonium methylide reaction mixture, maintained substantially anhydrous and under a nitrogen atmosphere, is added rapidly, with stirring at room temperature, a solution of 3.0 g. (0.0947 moles) of 20-spiroxa - 4,6 - diene-3-one in 5 ml. of dimethyl sulfoxide. The reaction is allowed to proceed overnight at room temperature, and the reaction mixture is then added to about 100 ml. of an ice-water mixture. The resulting aqueous mixture is extracted with two 100 ml.-portions of ether, and the combined extracts are washed with three 25 ml.-portions of water. The washed ethereal extract is dried over anhydrous sodium sulfate, and evaporated to dryness in vacuo. The resulting yellow foam, approximately 3.9 g., is suspended in petroleum ether, and solution is effected by addition of benzene. The resulting solution is chromatographed on an alumina column (ratio 30 parts by weight of alumina to 1 part by weight of crude reaction product) wet-packed with petroleum ether. The column is eluted with 10:90 mixture of ether:petroleum ether until mineral oil is eluted. The proportion of ether in the eluting solvent is then raised by 10% increments until a 60:40 mixture of ether:petroleum ether is reached; evaporation of the 60:40 eluate gives 6α,7α-methylene-20 - spirox - 4 - ene - 3 - one which is obtained as an oil. Increasing concentrations of ether up to 100% ether are then used to elute the column. Evaporation of the 100% ether eluate gives substantially pure 6β,7β-methylene - 20 - spirox - 4 - ene - 3 - one as crystalline material; each fraction from the chromatogram is seeded with this material; the fractions which partially or completely crystallize are combined to give approximately 900 mg. of 6β,7β - methylene - 20 - spirox - 4 - ene-3-one. Upon recrystallization once from ether, twice from hexane, and then from methanol, there is obtained analytically pure 6β,7β - methylene - 20 - spirox - 4 - ene - 3 - one; M.P. 153–155° C.

In accordance with the foregoing procedure, but employing 20-spiroxa - 4,6 - diene - 3,21 - dione as steroid starting material (instead of 20-spiroxa - 4,6 - diene - 3-one) together with an approximately equimolecular proportion of dimethyl-oxo-sulfonium methylide, there are obtained 6β,7β - methylene - 20 - spirox - 4 - ene - 3,21-dione and 6α,7α-methylene-20-spirox-4-ene-3,21-dione.

EXAMPLE 2

A mixture of 309 mg. (0.00131 mole) of 2,3-dichloro-5,6-dicyanobenzoquinone, 14.4 ml. of dry dioxane and 309 mg. (0.0010 mole) of 6α,7α - methylene-20-spirox-4-ene-3-one, is heated at reflux temperature under a nitrogen atmosphere for a period of about 3 hours. The reaction mixture is cooled, diluted with about 15 ml. of ethyl acetate, and the ethyl acetate layer is separated and washed alternately with 1.0 N aqueous sodium hydroxide solution, and with water until the sodium hydroxide wash solution remains clear. The washed ethyl acetate solution is dried over anhydrous sodium sulfate, and evaporated to give approximately 335 mg. of a red oil which is chromatographed using a 30:1 silica gel column wet-packed with petroleum ether. The column is eluted with ether-petroleum ether mixtures, first 10:90; then 20:80; and finally 30:70. Evaporation of the 30:70 eluate gives crystalline material which, upon recrystallization first from ether-petroleum ether; then from ether; and then from ethyl acetate containing a small amount of petroleum ether, gives approximately 71 mg. of substantially pure 6α,7α-methylene-20-spiroxa-1,4-diene-3-one.

In accordance with the foregoing procedure, but employing 6β,7β-methylene - 20 - spirox - 4 - ene - 3 - one as steroid starting material in place of the 6α,7α-methylene-20-spirox-4-ene-3-one there employed, there is obtained 6β,7β-methylene-20-spiroxa-1,4-diene-3-one.

Similarly, using as steroid starting material, 6α,7α-methylene - 20 - spirox - 4 - ene - 3,21 - dione or 6β,7β-methylene-20-spirox-4-ene - 3,21 - dione there is obtained, respectively, 6α,7α - methylene - 20 - spiroxa - 1,4 - diene-3,21-dione or 6β,7β - methylene-20-spiroxa - 1,4 - diene-3,21-dione.

EXAMPLE 3

A solution of 400 mg. of 6α-7α-methylene -20-spirox-4-ene-11β-ol-3-one in 4 ml. of pyridine is added to the complex formed by the addition of 40 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvent is evaporated therefrom in vacuo, and the residual material is purified by crystallization from petroleum ether to give 6α,7α-methylene-20-spirox-4-ene-3,11-dione.

In accordance with the foregoing procedure, but using 6β,7β - methylene - 20 - spirox - 4 - ene - 11β - ol - 3 - one as the steroid starting material, there is obtained 6β,7β-methylene-20-spirox-4-ene-3,11-dione.

Similarly, using as steroid starting material, 6α,7α-methylene - 20 - spirox - 4 - ene - 11β - ol - 3,21 - dione or 6β,7β - methylene - 20 - spirox - 4 - ene - 11β-ol-3,21-dione there is obtained, respectively, 6α,7α-methylene-20-spirox - 4 - ene - 3,11,21 - trione or 6β,7β-methylene-20-spirox-4-ene-3,11,21-trione.

EXAMPLE 4

To a thoroughly dry mixture of 0.4 g. of a 56.37% dispersion of sodium hydride in mineral oil (0.00947 mole) and 218 g. (0.00947 mole+5% excess) of trimethyl sulfoxonium iodide, maintained under a nitrogen atmosphere and cooled to a temperature of about 10° C., is slowly added 50 ml. of dry dimethyl sulfoxide at such a rate that foaming is not excessive. The resulting mixture is stirred at a temperature of about 20° C. for a period of about 2.5 hrs., or until all sodium hydride has reacted. To the thus formed dimethyl-oxo-sulfonium methylide reaction mixture, maintained substantially anhydrous and under a nitrogen atmosphere, is added rapidly, with stirring at room temperature, a solution of 3.0 g. (0.00947 mole) of 19-nor-20-spiroxa-4,6-diene-3-one in 5 ml. of dimethyl sulfoxide. The reaction is allowed to proceed overnight at room temperature, and the reaction mixture is then added to about 100 ml. of an ice-water mixture. The resulting aqueous mixture is extracted with two 100 ml.-portions of ether, and the combined extracts are washed with three 25 ml.-portions of water. The washed ethereal extract is dried over anhydrous sodium sulfate, and evaporated to dryness in vacuo. The resulting yellow foam, approximately 3.9 g. is suspended in petroleum ether, and solution is effected by addition of benzene. The resulting solution is chromatographed on an alumina column (ratio 30 parts by weight of alumina to 1 part by weight of crude reaction product) wet-packed with petroleum ether. The column is eluted with 10:90 mixture of ether:petroleum ether until mineral oil is eluted. The proportion of ether in the eluting solvent is then raised by 10% increments up to 100% ether. From the middle fractions is obtained 6α,7α-methylene-19-nor-20-spirox-4-ene-3-one, and from the mother liquors is obtained 6β,7β-methylene-19-nor-20-spirox-4-ene-3-one.

In accordance with the foregoing procedure, but employing 19-nor-20-spiroxa-4,6-diene-3,21-dione as steroid starting material in place of the 19-nor-20-spiroxa-4,6-diene-3-one there employed, there are obtaind 6β,7β-methylene-19-nor-20-spirox-4-ene-3,21-dione and 6α,7α-methylene-19-nor-20-spirox-4-ene-3,21-dione.

EXAMPLE 5

To a thoroughly dry mixture of 1.8 g. of a 56.37% dispersion of sodium hydride in mineral oil (0.04246 mole) and 9.81 g. 0.04264 mole+5% excess) of trimethyl sulfoxonium iodide, maintained under a nitrogen atmosphere and cooled to a temperature of about 10° C., is slowly added 50 ml. of dry dimethyl sulfoxide at such a rate that foaming is not excessive. The resulting mixture is stirred at a temperature of about 20° C. for a period of about 2.5 hrs., or until all sodium hydride has reacted. To the thus formed dimethyl-oxo-sulfonium methylide reaction mixture, maintained substantially anhydrous and under a nitrogen atmosphere, is added rapidly, with stirring at room temperature, a solution of 3.0 g. (0.00947 mole) of 9α-fluoro-20-spiroxa-4,6-diene-11β-ol-3-one in 5 ml. of dimethyl sulfoxide. The reaction is allowed to proceed overnight at room temperature, and the reaction mixture is then added to about 100 ml. of an ice-water mixture. The resulting aqueous mixture is extracted with two 100-ml. portions of ether, and the combined extracts are washed with three 25-ml. portions of water. The washed etheral extract is dried over anhydrous sodium sulfate, and evaporated to dryness in vacuo. The resulting yellow foam, approximately 4 g., is suspended in petroleum ether, and solution is effected by addition by benzene. The resulting solution is subjected to chromatography on an alumina column to give 6β,7β-methylene-9α-fluoro-20-spirox-4-ene-11β-ol-3-one and 6α,7α-methylene-9α-fluoro-20-spirox-4-ene-11β-ol-3-one.

In accordance with the foregoing procedure but employing 9α-fluoro-20-spiroxa-4,6-diene-11β-ol-3,21-dione as steroid starting material (instead of 9α-fluoro-20-spiroxa-4,6-diene-11β-ol-3-one) together with an approximately equimolar proportion of dimethyl-oxo-sulfonium methylide, there are obtained 6β,7β-methylene-9α-fluoro-20-spirox-4-ene-11β-ol-3,21-dione and 6α,7α-methylene-9α-fluoro-20-spirox-4-ene-11β-ol-3,21-dione.

EXAMPLE 6

To a thoroughly dry mixture of 1.8 g. of a 56.37% dispersion of sodium hydride in mineral oil (0.0426 mole) and 9.81 g. (0.04246 mole+5% excess) of trimethyl sulfoxonium iodide, maintained under a nitrogen atmosphere and cooled to a temperature of about 10° C., is slowly added 50 ml. of dry dimethyl sulfoxide at such a rate that foaming is not excessive. The resulting mixture is stirred at a temperature of about 20° C. for a period of about 2.5 hrs., or until all sodium hydride has reacted. To the thus formed dimethyl-oxo-sulfonium methylide reaction mixture, maintained substantially anhydrous and under a nitrogen atmosphere, is added rapidly, with stirring at room temperature, a solution of 3.0 g. (0.00947 mole) of 20-spiroxa-4,6-diene-11β-ol-3-one in 5 ml. of dimethyl sulfoxide. The reaction is allowed to proceed overnight at room temperature, and the reaction mixture is then added to about 100 ml. of an ice-water mixture. The resulting aqueous mixture is extracted with two 100 ml. portions of ether, and the combined extracts are washed with three 25 ml. portions of water. The washed etheral extract is dried over anhydrous sodium sulfate, and evaporated to dryness in vacuo. The resulting yellow foam, approximately 4 g. is suspended in petroleum ether, and solution is effected by addition of benzene. The resulting solution is subjected to chromatography on an alumina column to give 6β,7β-methylene- 20-spirox-4-ene-11β-ol-3-one and 6α,7α - methylene - 20-spirox-4-ene-11β-ol-3-one.

In accordance with the foregoing procedure, but employing 20-spiroxa-4,6-diene-11β-ol-3,21-dione as steroid starting material (instead of 20-spiroxa-4,6-diene-11β-ol-3-one) together with an approximately equimolecular proportion of dimethyl-oxo-sulfonium methylide, there are obtained 6β,7β-methylene-20-spirox-4-ene-11-β-ol-3,21-dione and 6α,7α-methylene-20-spirox-4-ene-11β-ol-3,21-dione.

EXAMPLE 7

A mixture of 309 mg. (0.00131 mole) of 2,3-dichloro-5,6-dicyanobenzoquinone, 14.4 ml. of dry dioxane and 309 mg. (0.0010 mole) of 6α,7α-methylene-9α-fluoro-20-spirox-4-ene-11β-ol-3-one, is heated at reflux temperature under a nitrogen atmosphere for a period of about 3 hours. The reaction mixture is cooled, diluted with about 15 ml. of ethyl acetate, and the ethyl acetate layer is separated and washed alternately with 1.0 N aqueous sodium hydroxide solution, and with water until the sodium hydroxide wash solution remains clear. The washed ethyl acetate solution is dried over anhydrous sodium sulfate, and evaporated to give approximately 335 mg. of a red oil which is subjected to chromatography using a silica gel column to give 6α,7α-methylene-9α-fluoro-20-spirox-1,4-diene-11β-ol-3-one.

In accordance with the foregoing procedure, but employing 6β,7β-methylene-9α-fluoro-20-spirox-4-ene-11β-ol-3-one as steroid starting material in place of the 6α,7α-methylene-9α-fluoro - 20 - spirox-4-ene-11β-ol-3-one there employed, there is obtained 6β,7β-methylene-9α-fluoro-20-spiroxa-1,4-diene-11β-ol-3-one.

Similarly, using as steroid starting material, 6α,7α-methylene-9α-fluoro - 20 - spirox-4-ene-11β-ol-3,21-dione or 6β,7β-methylene-9α-fluoro - 20 - spirox-4-ene-11β-ol-3,21-dione, there is obtained, respectively, 6α,7α-methylene-9α-fluoro - 20 - spiroxa-1,4-diene-11β-ol-3,21-dione or 6β,7β-methylene-9α-fluoro - 20 - spiroxa-1,4-diene-11β-ol-3,21-dione.

EXAMPLE 8

A mixture of 309 mg. (0.00131 mole) of 2,3-dichloro-5,6-dicyanobenzoquinone, 14.4 ml. of dry dioxane and 309 mg. (0.0010 mole) of 6α,7α-methylene-20-spirox-4-ene-11β-ol-3-one, is heated at reflux temperature under a nitrogen atmosphere for a period of about 3 hours. The reaction mixture is cooled, diluted with about 15 ml. of ethyl acetate, and the ethyl acetate layer is separated and washed alternately with 1.0 N aqueous sodium hydroxide solution, and with water until the sodium hydroxide wash solution remains clear. The washed ethyl acetate solution is dried over anhydrous sodium sulfate, and evaporated to give approximately 335 mg. of a red oil which is subjected to chromatography using a silica gel column to give 6α,7α-methylene-20-spiroxa-1,4-diene-11β-ol-3-one.

In accordance with the foregoing procedure, but employing 6β,7β-methylene - 20 - spirox-4-ene-11β-ol-3-one as steroid starting material in place of the 6α,7α-methylene-20-spirox-4-ene-11β-ol-3-one there employed, there is obtained 6β,7β-methylene - 20 - spiroxa-1,4-diene-11β-ol-3-one.

Similarly, using as steroid starting material, 6α,7α-methylene-20-spirox-4-ene-11β-ol-3,21 - dione or 6β,7β-methylene-20-spirox-4-ene-11β-ol-3,21-dione, there is obtained, respectively, 6α,7α-methylene-20-spiroxa-1,4-diene-11β-ol-3,21dione or 6β,7β-methylene-20-spiroxa-1,4-diene-11β-ol-3,21-dione.

EXAMPLE 9

A solution of 400 mg. of 6α,7α-methylene-9α-fluoro-20-spirox-4-ene-11β-ol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvent is evaporated therefrom in vacuo, and the residual material is purified by crystallization from ether to give 6α,7α-methylene-9α-fluoro-20-spirox-4-ene-3,11-dione.

In accordance with the foregoing procedure, but using 6β,7β-methylene-9α-fluoro - 20 - spirox-4-ene-11β-ol-3-one as the steroid starting material, there is obtained 6β,7β-methylene-9α-fluoro-20-spirox-4-ene-3,11-dione.

Similarly, using as steroid starting material, 6α,7α-methylene-9α-fluoro - 20 - spirox-4-ene-11β-ol-3,21-dione or 6β,7β-methylene-9α-fluoro - 20 - spirox-4-ene-11β-ol-3,21-dione there is obtained, respectively, 6α,7α-methylene-9α-fluoro - 20 - spirox-4-ene-3,11,21-trione or 6β,7β-methylene-9α-fluoro-20-spirox-4-ene-3,11,21-trione.

EXAMPLE 10

A solution of 400 mg. of 6α,7α-methylene-20-spiroxa-1,4-diene-11β-ol-3-one in 4 ml. of pyridine is added to the complex formed by the addition of 400 mg. of chromium trioxide to 4 ml. of pyridine. The reaction mixture is worked up in accordance with the method described in Example 9 to give 6α,7α-methylene-20-spiroxa-1,4-diene-3,11-dione.

Similarly, using 6β,7β-methylene-20-spiroxa-1,4-diene-11β-ol-3-one as the steroid starting material, there is obtained 6β,7β-methylene-20-spiroxa-1,4-diene-3,21-dione.

Similarly, using as steroid starting material, 6α,7α-methylene-20-spiroxa-1,4-diene-11β-ol-3,21-dione or 6β,7β-methylene - 20 - spiroxa - 1,4 - diene-11β-ol-3,21-dione there is obtained, respectively, 6α,7α-methylene-20-spiroxa-1,4-diene-3,11,21-trione or 6β,7β-methylene-20-spiroxa-1,4-diene-3,11,21-trione.

EXAMPLE 11

A solution of 400 mg. of 6α,7α-methylene-9α-fluoro-20-spiroxa-1,4-diene-11β-ol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvent is evaporated therefrom in vacuo, and the residual material is purified by crystallization from diethyl ether to give 6α,7α-methylene-9α-fluoro-20-spiroxa-1,4-diene-3,11-dione.

In accordance with the foregoing procedure, but using 6β,7β-methylene - 9α - fluoro-20-spiroxa-1,4-diene-11β-ol-3-one as the steroid starting material, there is obtained 6β,7β-methylene - 9α - fluoro-20-spiroxa-1,4-diene-3,11-dione.

Similarly, using as steroid starting material 6α,7α-methylene - 9α - fluoro-20-spiroxa-1,4-diene-11β-ol-3,21-dione or 6β,7β - methylene - 9α - fluoro-20-spiroxa-1,4-diene-11β-ol-3,21-dione there is obtained, respectively, 6α,7α-methylene - 9α - fluoro-20-spiroxa-1,4-diene-3,11-trione or 6β,7β - methylene - 9α - fluoro-20-spiroxa-1,4-diene-3,11,21-trione.

EXAMPLE 12

About 7.8 grams of chromium trioxide is added portionwise with stirring to 18.7 ml. of t-butanol, while maintaining the temperature at about 25° C. The resulting solution is poured into 50 ml. of carbon tetrachloride, the two layers are separated, and the organic layer is dried, and then evaporated to a volume of about 40 ml. to give a solution of t-butyl chromate.

About 35 ml. of this t-butyl chromate in carbon tetrachloride 8 ml. of acetic acid, and 4 ml. of acetic anhydride are added to a solution of two grams of 6β,7β-methylene-20-spirox-4-ene-3-one (prepared as described in Example 1 hereinabove) and the resulting mixture is heated under reflux for a period of about five hours.

To the reaction mixture is added a saturated aqueous solution of oxalic acid until the reddish color is diminished, and the mixture is then extracted with carbon tetrachloride. The organic layer is washed well with water, dried, and the solvent is evaporated. The residual material is purified by chromatography followed by recrystallization from aqueous methanol to give about 500 mg. of substantially pure 6β,7β-methylene-20-spirox-4-ene-3,21-dione.

In accordance with the foregoing procedure, but utilizing, as starting material, about 450 mg. of 6β,7β-methylene-20-spiroxa-1,4-diene-3-one, there are obtained approximately 150 mg. of 6β,7β-methylene-20-spiroxa-1,4-diene-3,21-dione.

EXAMPLE 13

To 177 mg. of 6β,7β-methylene-20-spirox-4-ene-3,21-dione dissolved in 4 ml. of ethanol is added 4.5 ml. of a 0.1 M aqueous solution of sodium hydroxide. The mixture is warmed to reflux temperature, and heated under reflux for 4 hours. The ethanol is evaporated from the reaction mixture under vacuum, and the residual aqueous mixture is diluted with additional water. The resulting mixture is extracted with chloroform, and then with ether, and the residual aqueous solution (which contains the sodium salt of the hydrolyzed lactone) is freeze-dried to give sodium 3'-(3-oxo-17β-hydroxy-6β,7β-methylene-androst - 4 - ene-17α-yl) propionate in substantially quantitative yield; M.P. 241–244° C., with decomposition.

In accordance with the foregoing procedure, but utilizing a 0.1 M aqueous solution of potassium hydroxide in place of the aqueous sodium hydroxide solution there employed, there is obtained, in substantially quantitative yield, potassium 3'-(3 - oxo - 17β - hydroxy-6β,7β-methylene-androst-4-ene-17α-yl) propionate.

Similarly, using as steroid starting material 6β,7β-methylene-20-spiroxa-1,4-diene-3,21-dione, there are obtained sodium 3'-(3 - oxo - 17β - hydroxy-6β,7β-methylene-androsta-1,4-diene-17α-yl) propionate and potassium 3'-(3-oxo - 17β - hydroxy-6β,7β-methylene-androsta-1,4-diene-17α-yl) propionate.

In similar manner, using as starting material 6β,7β-methylene-20-spirox-4-ene-3,11,21-trione, there are obtained the sodium and potassium salts of 3'-(3,11-dioxo-17β-hydroxy - 6β,7β - methylene-androst-4-ene-17α-yl) propionic acid; and using as starting material 6β,7β-methylene-20-spirox-4-ene-11β-ol-3,21-dione, there are obtained the sodium and potassium salts of 3'-(3-oxo-11β,17β-dihydroxy-6β,7β-methylene - androst - 4 - ene-17α-yl) propionic acid.

EXAMPLE 14

To 177 mg. of 6β,7β-methylene-20-spiroxa-1,4-diene-3,11,21-trione dissolved in 4 ml. of ethanol is added 4.5 ml. of a 0.1 M aqueous solution of sodium hydroxide. The alkaline mixture is warmed to reflux temperature and heated under reflux for a period of about 4 hours. The ethanol is evaporated from the reaction mixture under vacuum, and the resulting mixture is diluted with additional water. The resulting mixture is extracted with chloroform, and then with ether, and the residual aqueous solution (which contains the sodium salt of the hydrolyzed lactone) is freeze-dried to give sodium 3'-(3,11-dioxo - 17β - hydroxy-6β,7β-methylene-androsta-1,4-diene-17α-yl) propionate in substantially quantitative yield.

In accordance with the foregoing procedure, but utilizing a 0.1 M aqueous solution of potassium hydroxide in place of the aqueous sodium hydroxide solution there employed, there is obtained, in substantially quantitative yield, potassium 3'-(3,11-dioxo-17β-hydroxy-6β,7β-methylene-androsta-1,4-diene-17α-yl) propionate.

Similarly, using as steroid starting material 6β,7β-methylene-20-spiroxa-1,4-diene - 11β - ol - 3,21 - dione, there are obtained sodium 3'-(3-oxo-11β,17β-dihydroxy-6β,7β-methylene-androsta-1,4-diene-17α-yl) propionate and potassium 3' - (3 - oxo-11β,17β-dihydroxy-6β,7β-methylene-androsta-1,4-diene-17α-yl) propionate.

In similar manner, using as starting material 6β,7β-methyene - 9α - fluoro-20-spiroxa-1,4-diene-3,11,21-trione, there are obtained the sodium and potassium salts of 3'-(3, 11-dioxo - 9α - fluoro-17β-hydroxy-6β,7β-methylene-androsta-1,4-diene-17α-yl) propionic acid; and using as starting material 6β,7β - methylene - 9α - fluoro-20-spiroxa-1,4-diene-11β-ol-3,21-dione, there are obtained the sodium and potassium salts of 3'-(3 - oxo - 9α - fluoro-11β,17β-dihydroxy-6β,7β-methylene-androsta - 1,4 - diene - 17α - yl) propionic acid.

EXAMPLE 15

In accordance with the procedures of Examples 13 and 14, but employing the following steroid starting materials:

(1) 6α,7α-methylene-20-spirox-4-ene-3,21-dione;
(2) 6α,7α-methylene-20-spiroxa-1,4-diene-3,21-dione;
(3) 6α,7α-methylene-20-spirox-4-ene-3,11,21-trione;
(4) 6α,7α-methylene-20-spirox-4-ene-11β-ol-3,21-dione;
(5) 6α,7α-methylene-20-spiroxa-1,4-diene-3,11,21-trione;
(6) 6α,7α-methylene-20-spiroxa-1,4-diene-11β-ol-3,21-dione;
(7) 6α,7α-methylene-9α-fluoro-20-spirox-4-ene-3,21-dione;
(8) 6α,7α-methylene-9α-fluoro-20-spiroxa-1,4-diene-3,21-dione;
(9) 6α,7α-methylene-9α-fluoro-20-spirox-4-ene-3,11,21-trione;
(10) 6α,7α-methylene-9α-fluoro-20-spirox-4-ene-11β-ol-3,21-dione;
(11) 6α,7α-methylene-9α-fluoro-20-spiroxa-1,4-diene-3,11,21-trione;
(12) 6α,7α-methylene-9α-fluoro-20-spiroxa-1,4-diene-11β-ol-3,21-dione;

there are obtained the sodium and potassium salts of the following propionic acid derivatives, respectively, which have been numbered to correspond with that of the steroid starting materials:

(1) 3'-(3-oxo-17β-hydroxy-6α,7α-methylene-androst-4-ene-17α-yl)propionic acid;
(2) 3'-(3-oxo-17β-hydroxy-6α,7α-methylene-androsta-1,4-diene-17α-yl)propionic acid;
(3) 3'-(3,11-dioxo-17β-hydroxy-6α,7α-methylene-androst-4-ene-17α-yl)propionic acid;
(4) 3'-(3-oxo-11β,17β-dihydroxy-6α,7α-methylene-androst-4-ene-17α-yl)propionic acid;
(5) 3'-(3,11-dioxo-17β-hydroxy-6α,7α-methylene-androsta-1,4-diene-17α-yl)propionic acid;
(6) 3'-(3-oxo-11β,17β-dihydroxy-6α,7α-methylene-androsta-1,4-diene-17α-yl)propionic acid;
(7) 3'-(3-oxo-17β-hydroxy-6α,7α-methylene-9α-fluoro-androst-4-ene-17α-yl)propionic acid;
(8) 3'-(3-oxo-17β-hydroxy-6α,7α-methylene-9α-fluoro-androsta-1,4-diene-17α-yl)propionic acid;
(9) 3'-(3,11-dioxo-17β-hydroxy-6α,7α-methylene-9α-fluoro-androst-4-ene-17α-yl)propionic acid;
(10) 3'-(3-oxo-11β,17β-dihydroxy-6α,7α-methylene-9α-fluoro-androst-4-ene-17α-yl)propionic acid;
(11) 3'-(3,11-dioxo-17β-hydroxy-6α,7α-methylene-9α-fluoro-androsta-1,4-diene-17α-yl)propionic acid;
(12) 3'-(3-oxo-11β,17β-dihydroxy-6α,7α-methylene-9α-fluoro-androsta-1,4-diene-17α-yl)propionic acid.

Various changes and modifications may be made in carrying out the present invention without departing from the spirit and scope thereof. Insofar as these changes and modifications are within the purview of the annexed claims, they are to be considered as part of this invention.

What is claimed is:

1. The 3-oxygenated-20-spiroxane having the following formula:

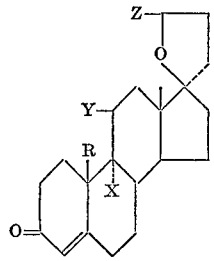

and $\Delta^1$-dehydro derivatives thereof, characterized in that R is hydrogen or methyl; Y is hydrogen, keto or $\beta$-hydroxy; X is hydrogen or fluoro; Z is hydrogen or keto and further characterized by the presence of a methylene substituent connecting the C–6 and C–7 carbon atoms.

2. The 3-oxygenated-20-spiroxane as defined in claim 1, which is further characterized in that the unsaturation in ring A consists solely of $\Delta^4$-double bond.

3. The 3-oxygenated-20-spiroxane as defined in claim 1, which is further characterized in that the unsaturation in ring A consists of $\Delta^{1,4}$-double bonds.

4. The 3-oxygenated-20-spiroxane as defined in claim 1, which has the chemical name 6,7-methylene-20-spiroxa-1,4-diene-3,11,21-trione.

5. The 3-oxygenated-20-spiroxane as defined in claim 1, which has the chemical name 6,7-methylene-20-spirox-4-ene-3-one.

6. The 3-oxygenated-20-spiroxane as defined in claim 1, which has the chemical name 6,7-methylene-20-spirox-4-ene-3,21-dione.

7. The 3-oxygenated-20-spiroxane as defined in claim 1, which has the chemical name 6,7-methylene-20-spiroxa-1,4-diene-3,21-dione.

8. The 3-oxygenated-20-spiroxane as defined in claim 1, which is further characterized in that Z is keto, and the unsaturation in ring A consists of $\Delta^{1,4}$-double bonds.

9. The 3-oxygenated-20-spiroxane as defined in claim 1, which has the chemical name 6,7-methylene-9$\alpha$-fluoro-20-spirox-4-ene-11$\beta$-ol-3-one.

10. The 3-oxygenated-20-spiroxane as defined in claim 1, which has the chemical name 6,7-methylene-20-spiroxa-1,4-diene-3-one.

11. The 3-oxygenated-20-spiroxane as defined in claim 1, which has the chemical name 6,7-methylene-9$\alpha$-fluoro-20-spiroxa-1,4-diene-11$\beta$-ol-3-one.

12. The 3-oxygenated-20-spiroxane as defined in claim 1, which has the chemical name 6,7-methylene-9$\alpha$-fluoro-20-spiroxa-1,4-diene-11$\beta$-ol-3,21-dione.

13. The 3-oxygenated-20-spiroxane as defined in claim 1, which has the chemical name 6,7-methylene-20-spiroxa-1,4-diene-11$\beta$-ol-3-one.

14. The 3-oxygenated-20-spiroxane as defined in claim 1, which has the chemical name 6,7-methylene-19-nor-20-spirox-4-ene-3-one.

15. The 3-oxygenated-20-spiroxane as defined in claim 1, which has the chemical name 6,7-methylene-19-nor-20-spirox-4-ene-3,21-dione.

16. The 3-oxygenated-20-spiroxane as defined in claim 1, which has the chemical name 6$\beta$,7$\beta$-methylene-20-spiroxa-1,4-diene-3,21-dione.

No references cited.

HENRY A. FRENCH, Primary Examiner

U.S. Cl. X.R.

260—239.57, 397.1, 999